US012600130B2

(12) United States Patent
Bernard et al.

(10) Patent No.: US 12,600,130 B2
(45) Date of Patent: Apr. 14, 2026

(54) EJECTION HEAD NOZZLE FLOODING CONTROL

(71) Applicant: Brady Worldwide, Inc., Milwaukee, WI (US)

(72) Inventors: David L. Bernard, Lexington, KY (US); Adam D. Carrithers, Lexington, KY (US); Brian T. Jones, Lexington, KY (US); Amber Taraska, Lexington, KY (US)

(73) Assignee: BRADY WORLDWIDE, INC., Milwaukee, WI (US)

( * ) Notice: Subject to any disclaimer, the term of this patent is extended or adjusted under 35 U.S.C. 154(b) by 106 days.

(21) Appl. No.: 18/453,613

(22) Filed: Aug. 22, 2023

(65) Prior Publication Data

US 2025/0065624 A1 Feb. 27, 2025

(51) Int. Cl.
*B41J 2/14* (2006.01)
*B41J 2/16* (2006.01)

(52) U.S. Cl.
CPC ........... *B41J 2/1433* (2013.01); *B41J 2/1631* (2013.01); *B41J 2002/14475* (2013.01)

(58) Field of Classification Search
CPC .................... B41J 2/1433; B41J 2/1631; B41J 2002/14475
See application file for complete search history.

(56) References Cited

U.S. PATENT DOCUMENTS

| | | | |
|---|---|---|---|
| 5,988,803 | A | 11/1999 | Komplin et al. |
| 6,095,643 | A | 8/2000 | Cook et al. |
| 6,151,045 | A | 11/2000 | Beach et al. |
| 6,328,424 | B1 | 12/2001 | Denton et al. |
| 6,341,842 | B1 | 1/2002 | Beach et al. |
| 6,481,837 | B1 | 11/2002 | Askren et al. |
| 6,692,112 | B2 | 2/2004 | Kim et al. |
| 6,918,653 | B2 | 7/2005 | Ahne et al. |
| 6,938,989 | B2 | 9/2005 | Silverbrook |
| 7,464,465 | B2 | 12/2008 | Silverbrook |
| 7,794,613 | B2 | 9/2010 | McAvoy et al. |
| 7,841,700 | B2 | 11/2010 | Cannon et al. |
| 7,954,926 | B2 | 6/2011 | Bertelsen et al. |
| 8,007,990 | B2 | 8/2011 | Patil et al. |
| 8,057,013 | B2 | 11/2011 | Kwon et al. |

(Continued)

FOREIGN PATENT DOCUMENTS

| | | | |
|---|---|---|---|
| EP | 0631869 | B1 | 3/2000 |
| JP | S58224758 | A | 12/1983 |

(Continued)

OTHER PUBLICATIONS

Extended European Search Report dated Dec. 8, 2025; Application No. 24193522.0—(11) pages.

*Primary Examiner* — Jason S Uhlenhake
(74) *Attorney, Agent, or Firm* — Brianna Schonenberg

(57) ABSTRACT

A nozzle plate configured for a fluid ejection head, a fluid ejection head containing the nozzle plate and a method for modifying a nozzle plate to reduce fluid flooding thereon. The nozzle plate includes a plurality of nozzle holes therein attached to a flow feature layer on a semiconductor substrate, and includes a first hydrophobic region surrounding each of the plurality of nozzle holes, whereby the first hydrophobic region is configured to reduce flooding of the nozzle plate.

8 Claims, 9 Drawing Sheets

(56) References Cited

U.S. PATENT DOCUMENTS

| | | | |
|---|---|---|---|
| 8,083,321 | B2 | 12/2011 | Krawczyk et al. |
| 8,491,803 | B2 | 7/2013 | McAvoy et al. |
| 8,728,715 | B2 | 5/2014 | Bernard et al. |
| 8,844,137 | B2 | 9/2014 | Cai et al. |
| 9,365,044 | B1 | 6/2016 | Dryer et al. |
| 9,403,365 | B2 | 8/2016 | Bernard et al. |
| 9,855,566 | B1 | 1/2018 | Craft et al. |
| 10,031,415 | B1 | 7/2018 | Bernard et al. |
| 10,336,071 | B2 | 7/2019 | Poulikakos et al. |
| 10,599,034 | B2 | 3/2020 | Bernard et al. |
| 11,642,886 | B2 | 5/2023 | Marra, III |
| 11,642,887 | B2 | 5/2023 | Marra, III |
| 11,958,292 | B2 | 4/2024 | Weaver |
| 11,987,052 | B2 | 5/2024 | Graham et al. |
| 12,011,928 | B2 | 6/2024 | Graham et al. |
| 2005/0219313 | A1 | 10/2005 | Sugahara |
| 2006/0221115 | A1 | 10/2006 | Patil |
| 2008/0007595 | A1 | 1/2008 | Krawczyk et al. |
| 2008/0113277 | A1 | 5/2008 | Cominetti et al. |
| 2008/0129799 | A1 * | 6/2008 | Lee ...................... B41J 2/14233 347/71 |
| 2008/0150998 | A1 | 6/2008 | Okamura |
| 2009/0066771 | A1 * | 3/2009 | Mihara .................. B41J 2/1753 347/102 |
| 2009/0098488 | A1 | 4/2009 | Patil et al. |
| 2009/0147049 | A1 * | 6/2009 | Lee ........................ B41J 2/1433 216/27 |
| 2011/0050785 | A1 | 3/2011 | Sawada |
| 2012/0092410 | A1 | 4/2012 | Graham et al. |
| 2013/0235120 | A1 | 9/2013 | Hirabayashi et al. |
| 2014/0048547 | A1 | 2/2014 | Larrobis, Jr. et al. |
| 2014/0083974 | A1 | 3/2014 | Matsumoto et al. |
| 2014/0141379 | A1 | 5/2014 | Uohashi et al. |
| 2014/0183087 | A1 | 7/2014 | Weaver et al. |
| 2014/0292908 | A1 | 10/2014 | Watanabe et al. |
| 2014/0311661 | A1 | 10/2014 | Tsutsui et al. |
| 2016/0052270 | A1 | 2/2016 | Tsutsui et al. |
| 2020/0108608 | A1 | 4/2020 | Tsutsui |
| 2020/0209742 | A1 | 7/2020 | Tsutsui et al. |
| 2021/0011382 | A1 | 1/2021 | Weaver |
| 2021/0213738 | A1 | 7/2021 | Tsutsui et al. |
| 2021/0276332 | A1 | 9/2021 | Chen et al. |
| 2023/0168580 | A1 | 6/2023 | Graham et al. |
| 2023/0364625 | A1 | 11/2023 | Marra, III |
| 2024/0308229 | A1 | 9/2024 | Weaver |
| 2025/0065624 | A1 | 2/2025 | Bernard et al. |

FOREIGN PATENT DOCUMENTS

| | | | |
|---|---|---|---|
| JP | 2006159764 | A | 6/2006 |
| JP | 2017121787 | A | 7/2017 |
| KR | 100197041 | B1 | 6/1999 |

* cited by examiner

EJECTION HEAD NOZZLE FLOODING CONTROL

TECHNICAL FIELD

The disclosure is directed to an improved photoimageable nozzle member for fluid ejection devices and methods and structures for reducing fluid flooding with respect to adjacent nozzle holes during fluid ejection.

BACKGROUND AND SUMMARY

Flooding, weeping, or drooling is a common phenomenon seen in fluid ejection devices, especially those related to fluid dispensing wherein the meniscus of the jetting fluid unpins from the nozzle hole boundary and spreads across the face of the nozzle plate. For the purposes of this disclosure, "flooding" is defined as an undesired accumulation of fluid on the surface of the ejection head. Flooding can cause cross-contamination between jetting fluids, reduce the performance of the device, or even render the device inoperable without intervention.

Typically, flooding occurs due to suboptimal device design for a given set of fluid properties or from improper dispensing parameters, causing the dispensing to become unstable. A desirable characteristic of ejection heads for hydrophilic fluids such as ink is a hydrophobic ejection face to both deter flooding and to minimize the spread of the fluid across the face of the nozzle plate if flooding does occur. If the fluid ejection device is operated such that it only dispenses in short bursts, flooding can sometimes self-correct once the stable condition returns and fluid is able to return to the nozzle through which the fluid is ejected. However, when flooding chains across multiple nozzles, it is improbable for the device to self-correct even after returning to a stable condition and the flooding must be mechanically removed, typically by wiping the face of the nozzle plate.

The possibility of flooding is usually taken into consideration during the design of an ejection head for a standard horizontal orientation of the ejection head wherein the nozzles are pointed in a downward direction. Flooding chains become more likely when the ejection head is reoriented so that the nozzle plate is oriented horizontally with the nozzles pointed in an upward direction, when the nozzle plate is non-horizontally oriented, and when the nozzle plate is vertical, and the nozzles are pointed perpendicular to gravity. In the vertical orientation, flooding is further exacerbated by gravity pulling an unstable meniscus towards a nozzle positioned adjacently below a nozzle from which fluid is ejected.

Accordingly, what is needed is an ejection head having features that inhibit flooding or that redirect flooding away from adjacent nozzles, especially when the ejection head is operated in a nonstandard orientation.

In view of the foregoing, an embodiment of the disclosure provides a nozzle plate configured for a fluid ejection head, a fluid ejection head containing the nozzle plate and a method for modifying a nozzle plate to reduce fluid flooding thereon. The nozzle plate includes a plurality of nozzle holes therein attached to a flow feature layer on a semiconductor substrate, and includes a first hydrophobic region surrounding each of the plurality of nozzle holes, whereby the first hydrophobic region is configured to reduce flooding of the nozzle plate.

In some embodiments, a second hydrophobic layer is provided on an exposed surface of the nozzle plate, wherein the second hydrophobic layer has a raised hydrophobic region relative to the first hydrophobic layer.

In some embodiments, the nozzle plate includes a hydrophilic region adjacent to the first hydrophobic region.

In some embodiments, the nozzle plate has a raised second hydrophobic region over the hydrophilic region, wherein the raised second hydrophobic region has a channel therein in fluid flow communication with the first hydrophobic region surrounding each of the plurality of nozzle holes, and the channel is configured to channel fluid away from each of the plurality of nozzle holes through the raised second hydrophobic region. In other embodiments, the channel is wedge-shaped.

In some embodiments, there is provided a fluid ejection head. The fluid ejection head includes a semiconductor substrate containing a plurality of fluid ejectors thereon, a flow feature layer attached to the semiconductor substrate, and a nozzle plate containing a plurality of nozzle holes therein attached to the flow feature layer on a semiconductor substrate, wherein the nozzle plate contains a first hydrophobic region surrounding each of the plurality of nozzle holes, whereby the first hydrophobic region is configured to reduce flooding of the nozzle plate.

In other embodiments, there is provided a method for modifying a nozzle plate for a fluid ejection device to reduce fluid flooding thereon. The method includes applying a sacrificial layer to an exposed surface of the nozzle plate, wherein the exposed surface of the nozzle plate is hydrophobic. The sacrificial layer is imaged and developed to provide a protective cap over each nozzle hole in the nozzle plate, wherein the protective cap has a greater diameter than the nozzle hole covered by the protective cap. The uncapped surface of the nozzle plate is treated to provide an uncapped hydrophilic surface region of the nozzle plate. The protective cap is then removed from each nozzle hole of the nozzle plate to provide a nozzle plate having a first hydrophobic region surrounding each nozzle hole and a hydrophilic region adjacent to the first hydrophobic region. In other embodiments, the sacrificial layer is a positive photoresist material layer.

In some embodiments, a negative photoresist material is applied to an exposed surface of the nozzle plate and the negative photoresist material is imaged and developed to provide a raised second hydrophobic region over the hydrophilic region adjacent to the first hydrophobic region surrounding each nozzle hole. In other embodiments, a channel is imaged and developed in the raised second hydrophobic region down to the hydrophilic region to direct fluid away from each nozzle hole.

The foregoing embodiments provide a fluid ejection head featuring fluid boundary regions and fluid runoff regions on an exposed surface of a nozzle plate to promote self-correction of flooded nozzles and inhibit cross-linked flooding of nozzles by improved retainment or redirection of fluids that may pool on the nozzle plate surface.

DETAILED DESCRIPTION OF EXEMPLARY EMBODIMENTS

Figure 1:
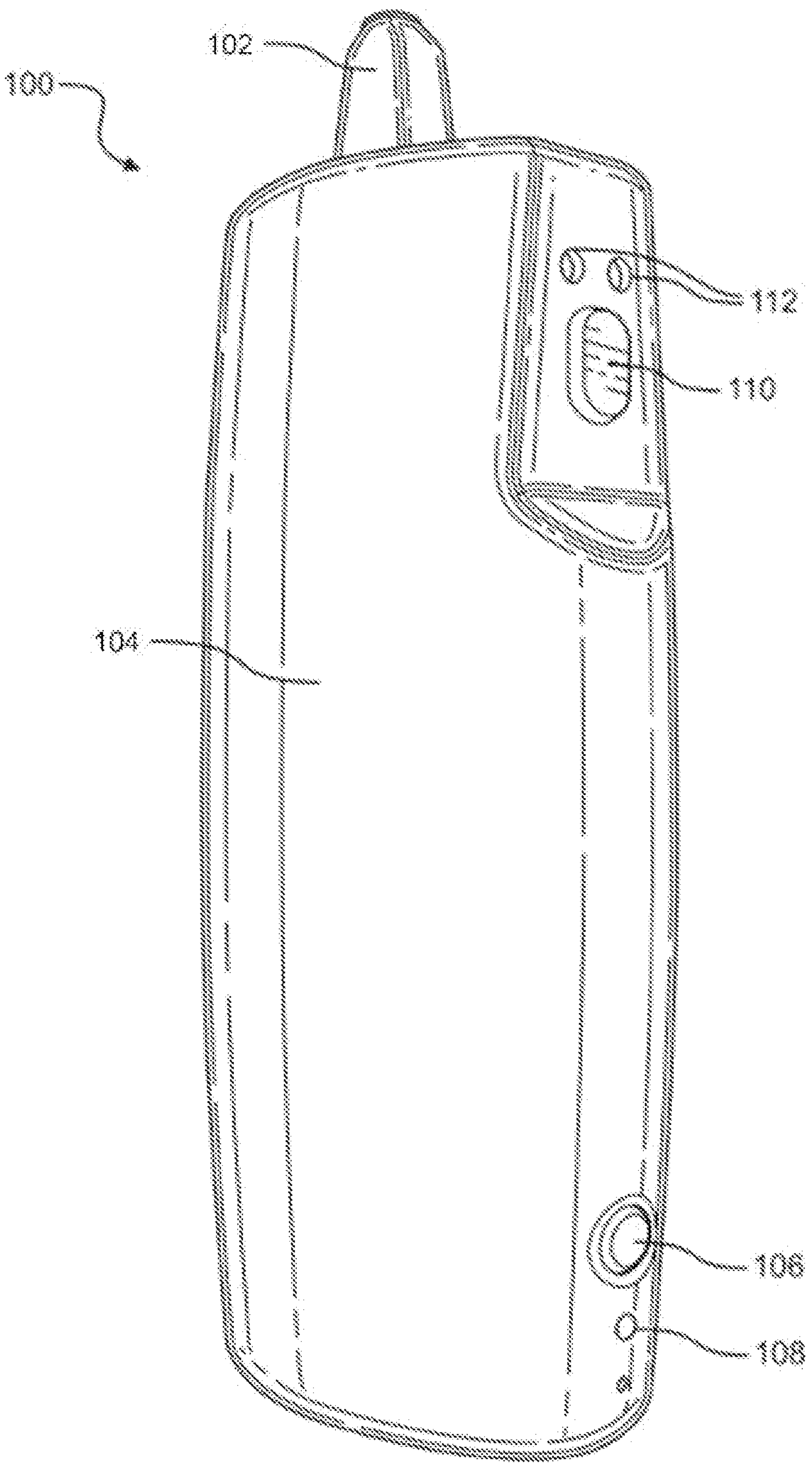
FIG. 1 is a perspective view, not to scale, of a fluid ejection device according to the disclosure.

The disclosure is directed to improved fluid ejection heads and in particular to improvements related to nozzle plates for the fluid ejection heads for fluid dispense devices. The fluid ejection heads may be used in a wide variety of fluid ejection devices including but not limited to printers, and nasal spray devices 100 (FIG. 1) for delivery of pharmaceutical drugs to a patient, devices for depositing one or more fluids into wells of a micro-well plate or onto glass slides, and the like. In devices such as the nasal spray device 100, a precise amount of a pharmaceutical drug must be delivered through a nozzle 102 to a patient by use of a fluid ejection head that is attached to a fluid cartridge in a body 104 of the device. A power button 106 and power indicator LED 108 is provided to indicate that the device is ready for activation. A dosage button 110 may be activated by the patient to deliver the prescribed dosage of fluid from the ejection head as indicated by LED's 112. However, if fluid pools on the ejection head, improper dispensing of the pharmaceutical drug may occur. This is particularly troublesome in such devices 100 wherein the fluid ejection head may not be used in a horizontal, downward fluid ejection sequence. Such devices 100, often do not include a wiper blade to remove excess fluid from the surface of the nozzle plate. Accordingly, the improved nozzle plate and fluid ejection head described herein provides a means for reducing or preventing fluids from accumulating on a nozzle plate surface adjacent to nozzle holes in the nozzle plate. The devices and methods described herein may also reduce or eliminate cross-contamination of fluids on a nozzle plate surface wherein the ejection head is configured to eject multiple different fluids.

Figure 2:
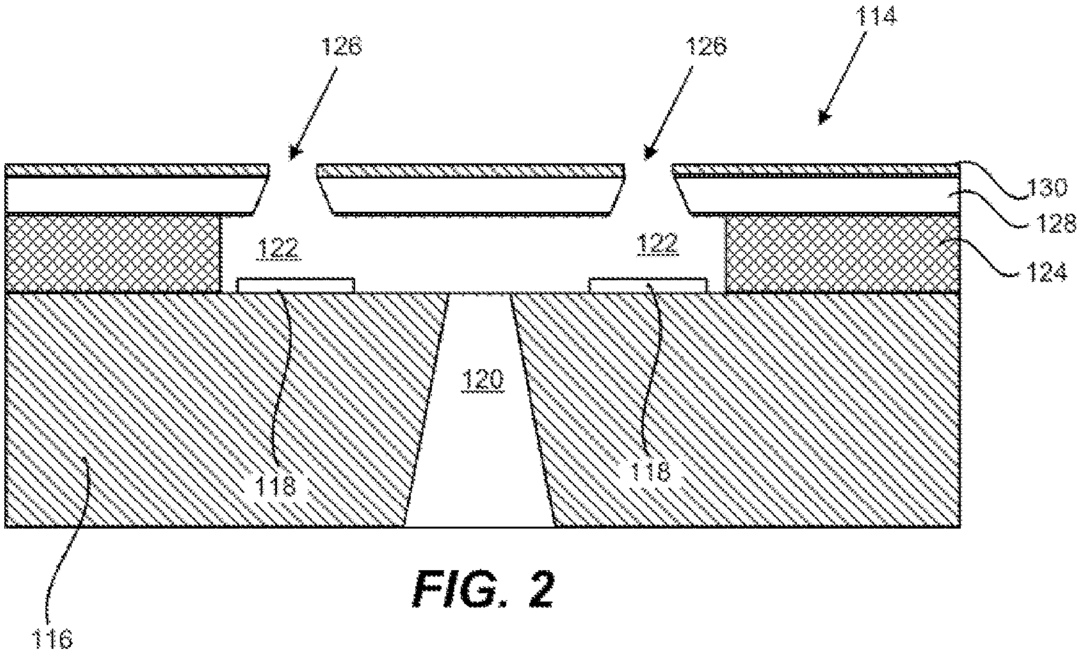
FIG. 2 is a cross-sectional view, not to scale, of a portion of an ejection head according to the disclosure.

A portion of a fluid ejection head 114 is illustrated in FIG. 2. The fluid ejection head 114 includes a semiconductor substrate 116 that has fluid ejectors 118 deposited thereon. The fluid ejectors 118 may be heater resistors or piezoelectric devices. Fluid is provided to the fluid ejection head from the fluid cartridge in the device body 104 through a fluid via 120 etched through the semiconductor substrate 116. The fluid then flows into fluid chambers 122 in a flow feature layer 124 wherein the fluid is caused by the fluid ejectors 118, when activated, to be expelled through nozzle holes 126 in a nozzle plate layer 128. An uppermost layer 130 of the nozzle plate 128 is a hydrophobic layer. Accordingly, layer 130 may include a hydrophobicity agent such as heptadecafluorodecyltrimethoxysilane, octadecyldimethylchlorosilane, octadecyltrichlorosilane, methyltrimethoxysilane, octyltriethoxysilane, phenyltrimethoxysilane, t-butylmethoxysilane, tetraethoxysilane, sodium methyl siliconate, vinyltrimethoxysilane, N-(3-(trimethoxylsilyl)propyl)ethylenediamine polymethylmethoxysiloxane, polydimethylsiloxane, polyethylhydrogensiloxane, and dimethyl siloxane. The hydrophobicity agent may be included in the layer 130 or a hydrophobicity agent may be coated onto the nozzle plate layer 128. The thickness of the hydrophobic layer 130 may range from about 3 microns to about 10 microns.

Figure 3:
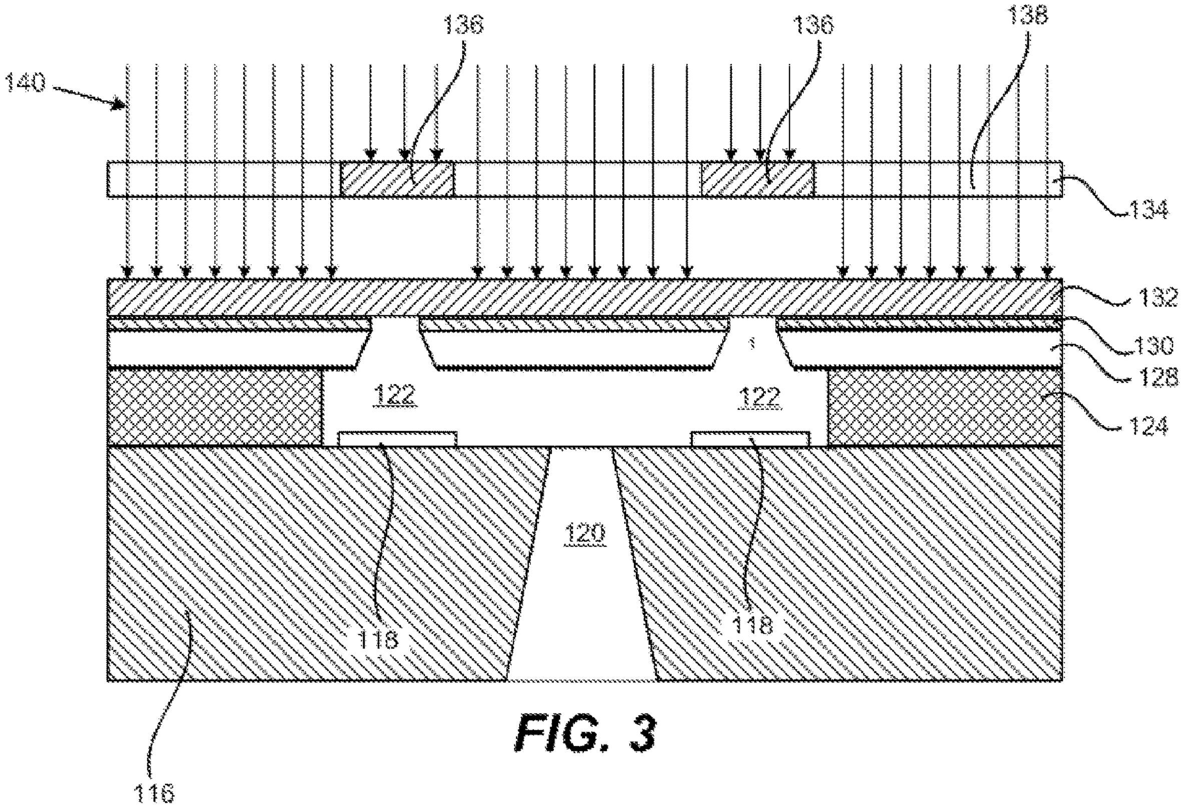
FIGS. 3-6 are cross-sectional views, not to scale, of an ejection head being made according to a first embodiment of the disclosure.
Figure 4:
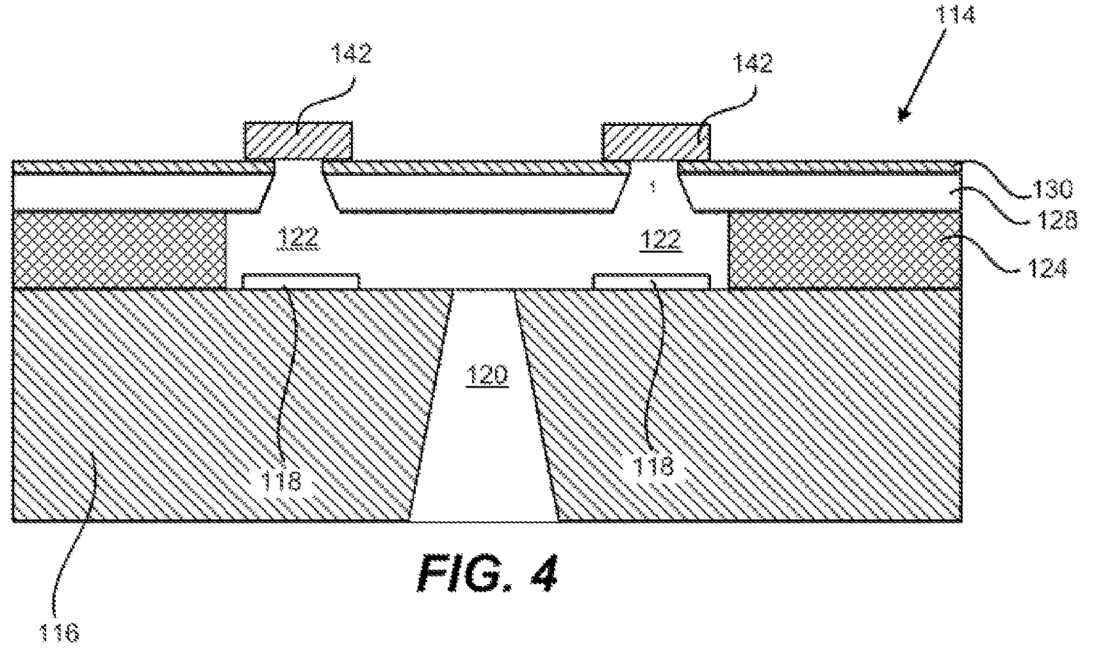
Figure 5:
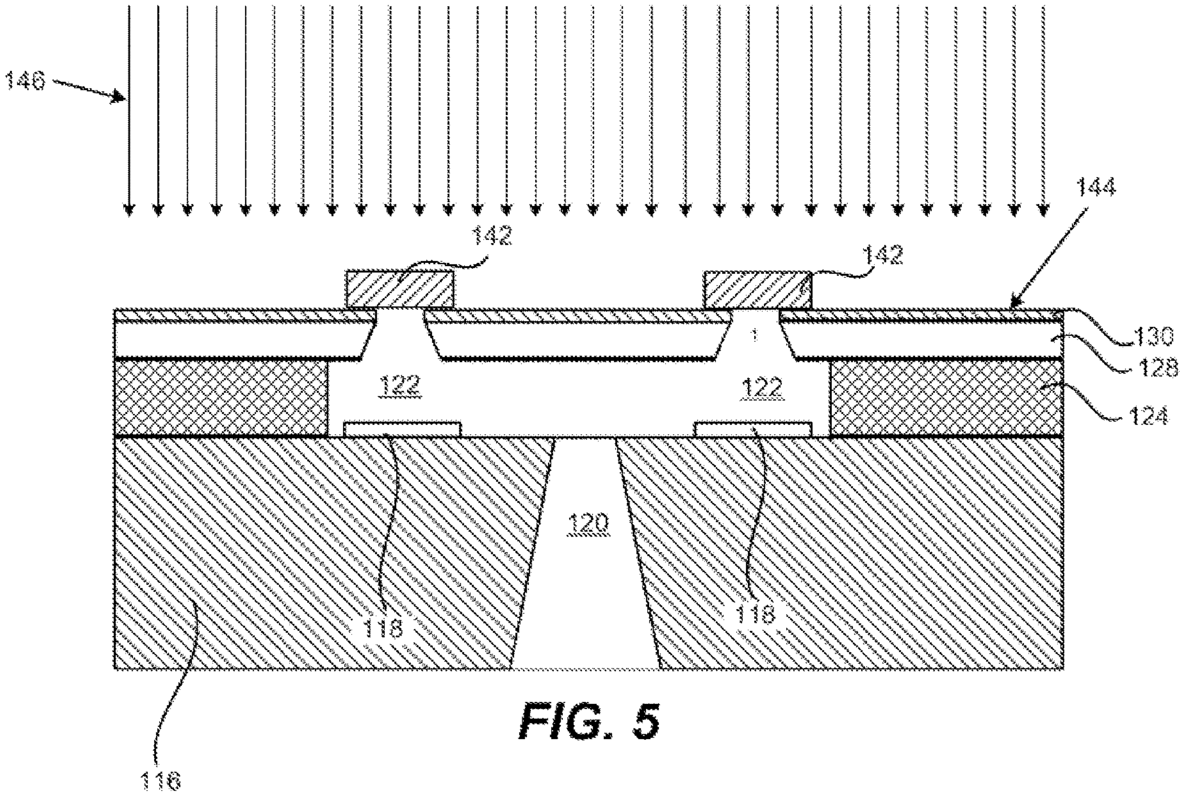
Figure 6:
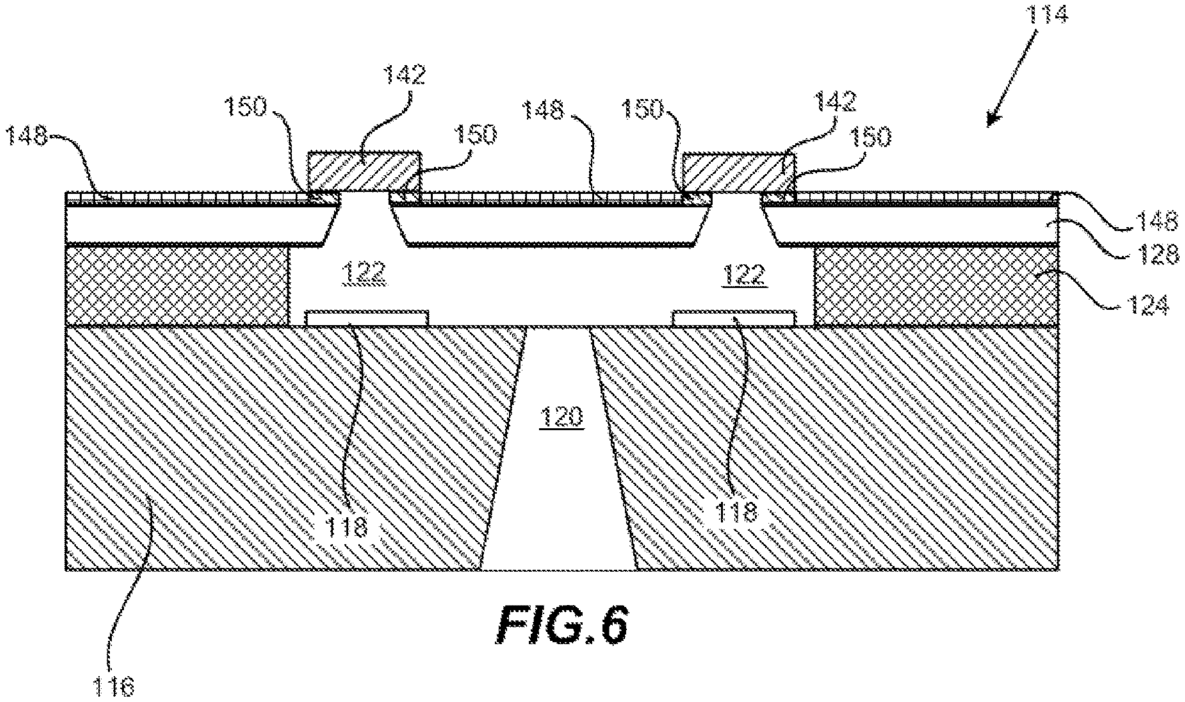
Figure 7:
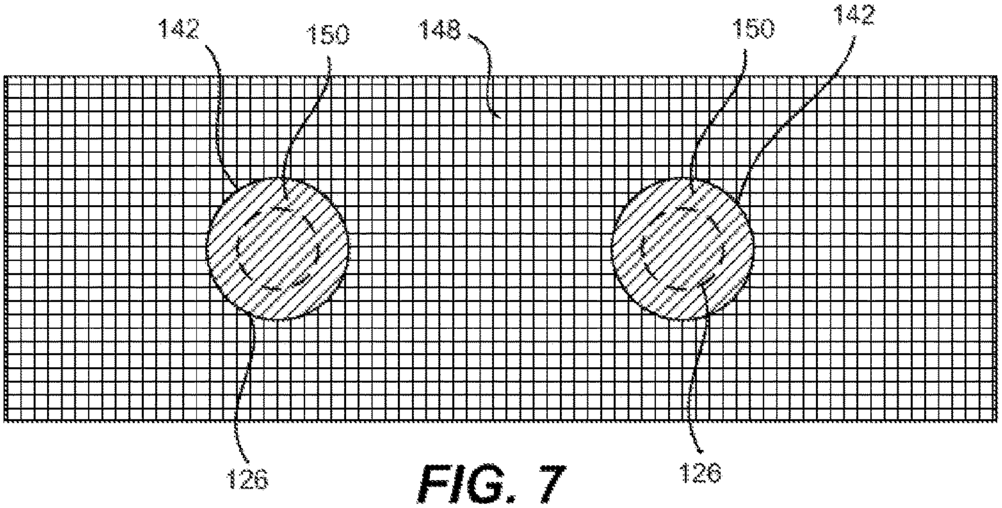
FIG. 7 is a plan view, not to scale, of the ejection head of FIG. 6.

In a first embodiment of the disclosure, a sacrificial layer 132 such as a positive photoresist layer may be applied to the layer 130 of the nozzle plate 128/130 as shown in FIG. 3 by spin coating or laminating the sacrificial layer 132 to layer 130. The thickness of the sacrificial layer is not particularly critical provided the sacrificial layer 132 has a viscosity sufficient to span the nozzle holes 126. Accordingly, the sacrificial layer may have a thickness ranging from about 5 microns to about 50 microns. The layer 132 may then be imaged through a mask 134 that includes opaque areas 136 and transparent areas 138 using actinic radiation such as ultraviolet light indicated by arrows 140. After developing the exposed portions of the layer 132, protective caps 142 remain over the nozzle holes 126 as shown in FIG. 4. The exposed surface 144 of the nozzle plate 128/130 is treated with an oxygen plasma as indicated by arrows 146 to change the surface energy of the exposed areas thereby providing hydrophilic regions 148 surrounding the capped hydrophobic regions 150 of the nozzle plate as shown in plan view in FIG. 7. The hydrophilic regions may have the same thickness as layer 130, described above.

Figure 8:
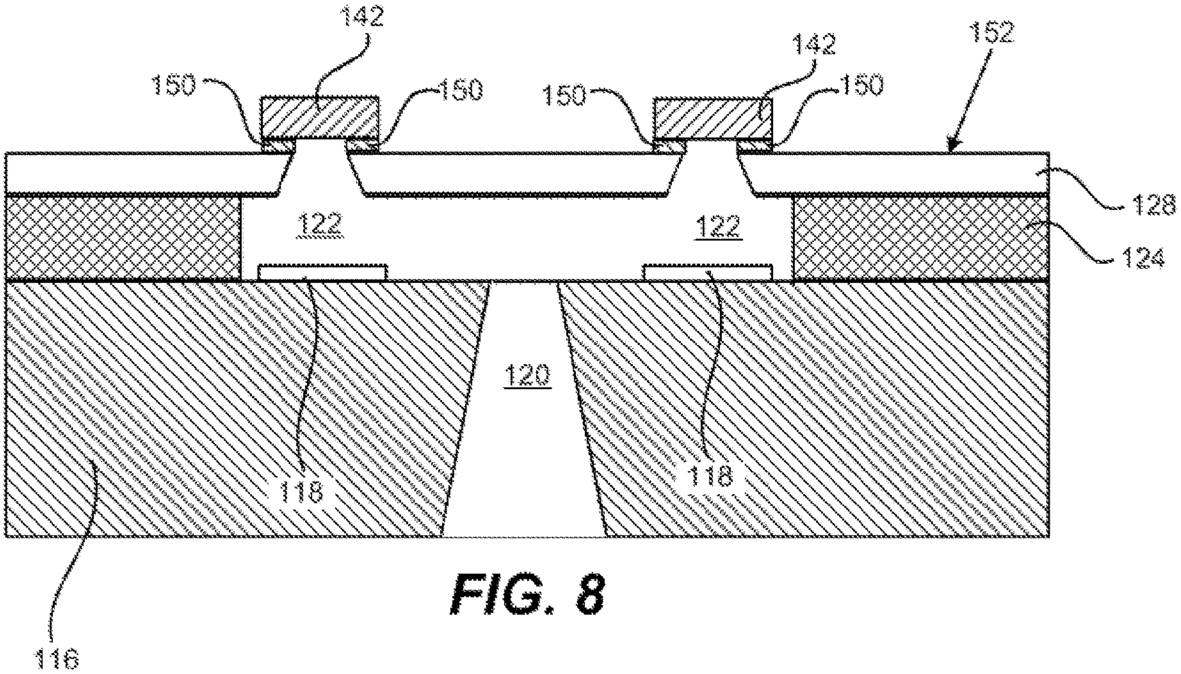
FIG. 8 is a cross-sectional view, not to scale, of a portion of an ejection head being made according to a second embodiment of the disclosure.
Figure 9:
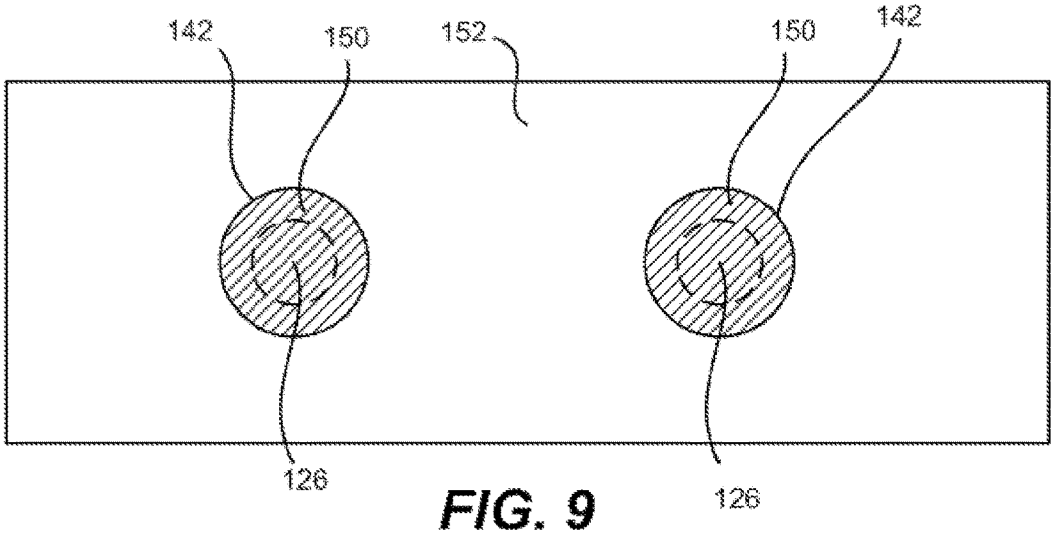
FIG. 9 is a plan view, not to scale, of the ejection head of FIG. 8.

In a second embodiment, illustrated in FIGS. 8-9, the fluid ejection head 114 has a nozzle plate layer 128 that is hydrophilic beneath the hydrophobic layer 130. Accordingly, the exposed surface 144 of the nozzle plate 128/130 may be subjected to a biased, heated, and highly selective RF plasma etch, wherein the protective caps 142 shield the hydrophobic region 150 around each nozzle hole 126 while unshielded regions 152 of the nozzle plate are made hydrophilic by removal of the hydrophobic layer 130 as shown in FIG. 8.

Other surface treatments may be used to increase the hydrophilicity of the exposed nozzle plate surface 152. For example, a high bias plasma may be used on the surface to impart surface roughness via a sputtering effect in addition to modifying the surface energy of the exposed nozzle plate surface 152. Roughening the surface may aid in improving adhesion to a subsequently applied layer of material. Plasma etching is preferred for creating permanent hydrophilic regions on the surface 152 of the nozzle plate, while plasma treatment is typically used to improve adhesion to additional layers. Various gases, such as forming gas and oxygen gas may be used in the process to alter the surface chemistry of the exposed nozzle plate surface 152.

Figure 10:
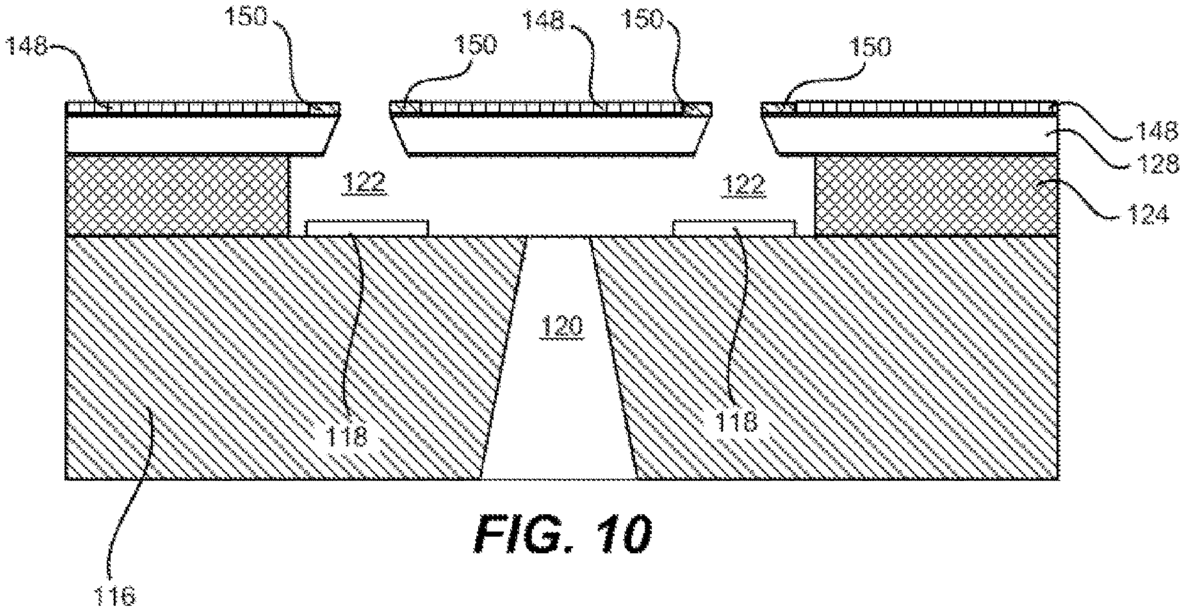
FIG. 10 is a cross-sectional view, not to scale, of a finished ejection head according to the second embodiment of the disclosure.
Figure 11:
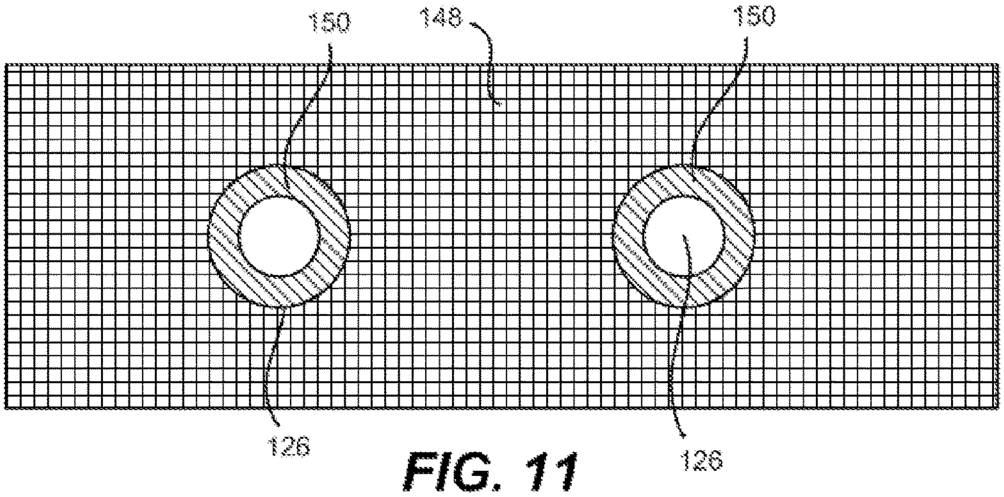
FIG. 11 is a plan view, not to scale, of the ejection head of FIG. 10.
Figure 12:
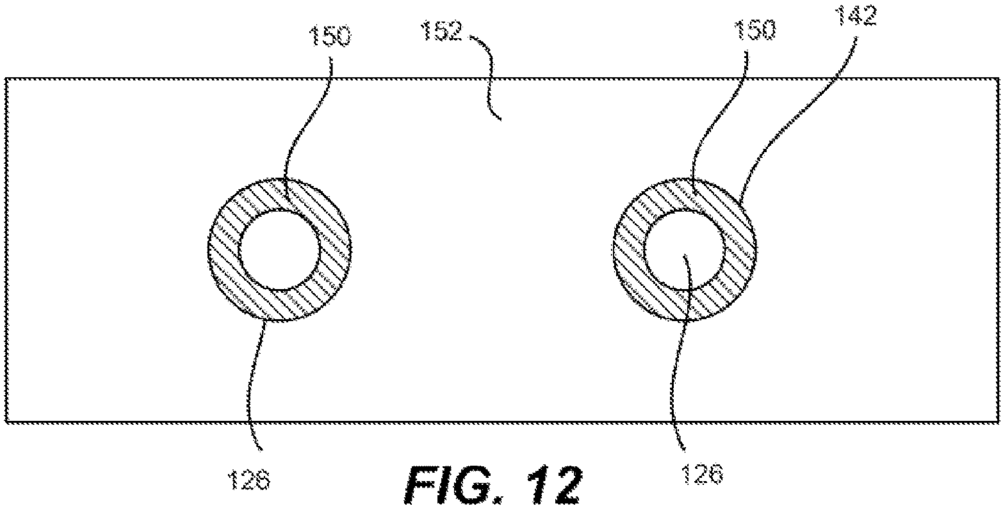
FIG. 12 is a plan view, not to scale, of the ejection head of FIG. 8 with the protective caps removed.

In the first and second embodiment, the protective caps 142 are then stripped from the hydrophobic regions 150 (FIG. 10) to provide a nozzle plate having only a hydrophobic region 150 surrounding each of the nozzle holes 126 and a hydrophilic region 148 (FIG. 11) or a hydrophilic region 152 (FIG. 12) surrounding the hydrophobic region 150. The protective caps 142 may be stripped using a conventional photoresist solvent bath and a high or low pressure rinse or using a conventional deep reactive ion etch stripping process for photoresist materials.

Figure 13:
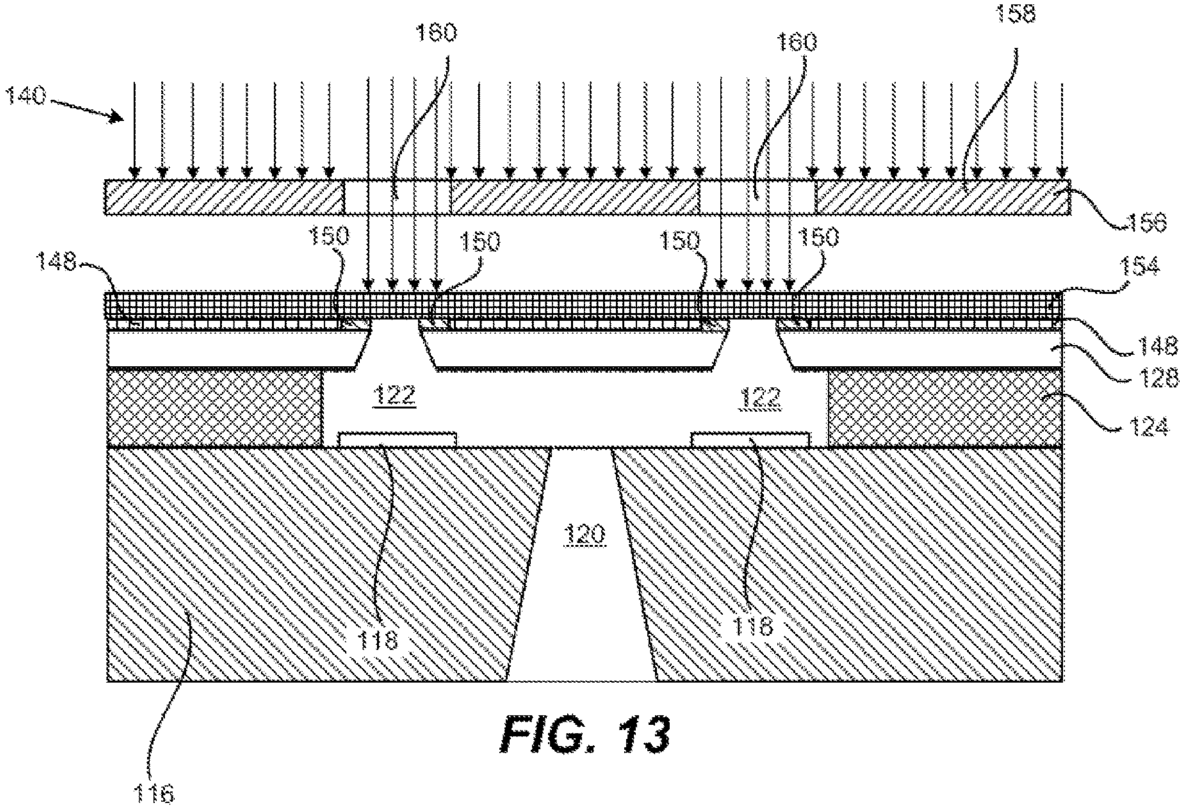
FIGS. 13-14 are cross-sectional views, not to scale, of an ejection head being made according to a third embodiment of the disclosure.
Figure 14:
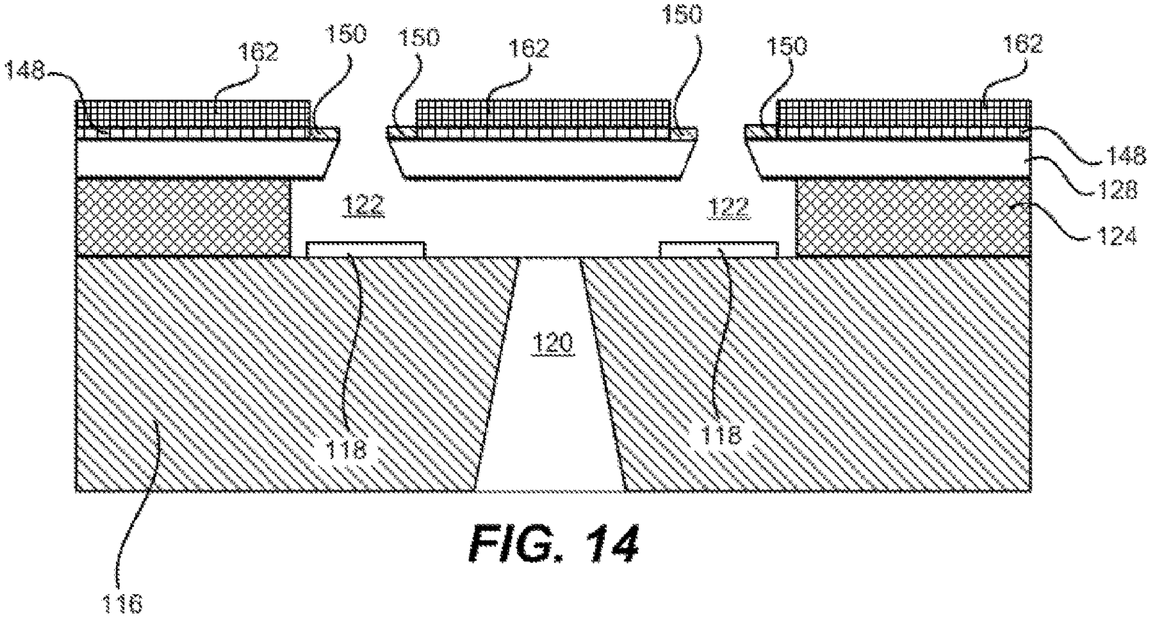

In a third embodiment of the disclosure, a negative photoresist material 154 is applied to the stripped surface (FIG. 10) of the nozzle plate by spin-coating, spray coating or laminating thereto to cover the hydrophobic regions 150 and hydrophilic regions 148 as shown in FIG. 13. The negative photoresist material has a thickness ranging from about 1 micron to about 5 microns, such as from about 1.5 microns to 2.5 microns. The negative photoresist material 154 is imaged through a mask 156 containing opaque areas 158 and transparent areas 160 using actinic radiation 140 as described above. Upon developing the imaged negative photoresist layer 154, hydrophobic levees 162 are created (FIG. 14) on the hydrophilic regions 148 to inhibit flooding from spreading to the nozzles 126 across the nozzle plate surface. In some embodiments, the negative photoresist material 154 is hydrophobic. In other embodiments, the negative photoresist material is hydrophilic.

Figure 15:
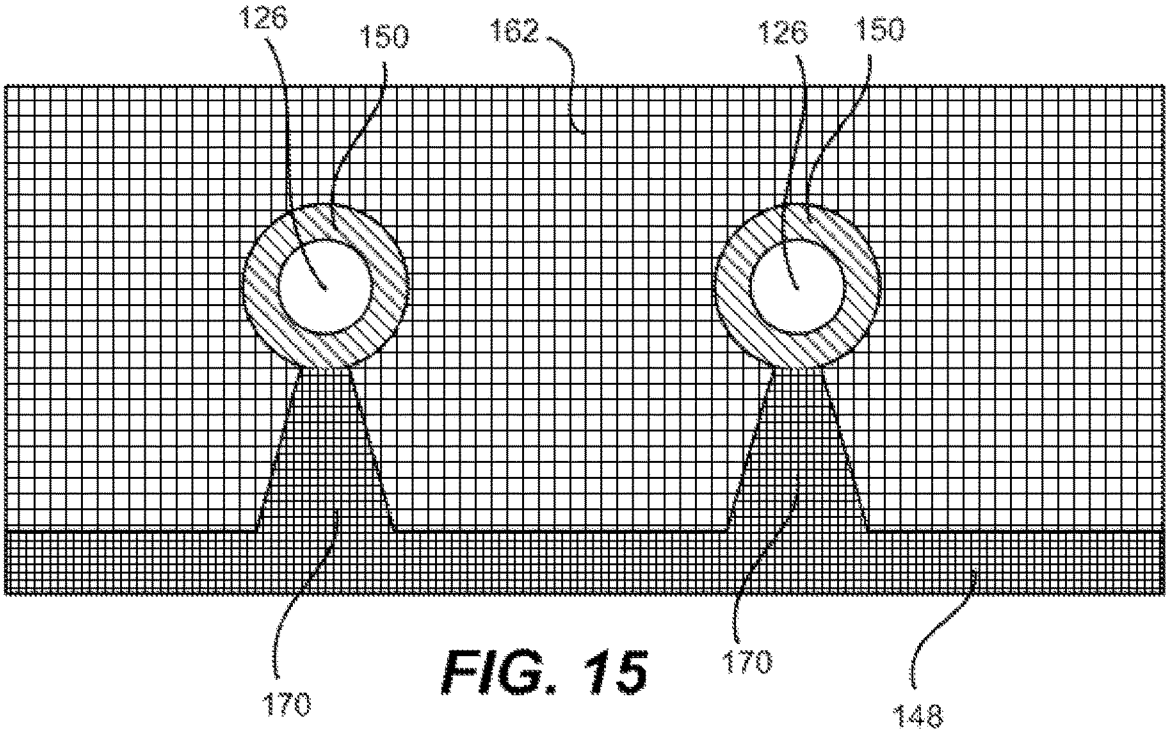
FIGS. 15-16 are plan views, not to scale, of an ejection head according to a fourth embodiment of the disclosure using the ejection head of FIG. 14.
Figure 16:
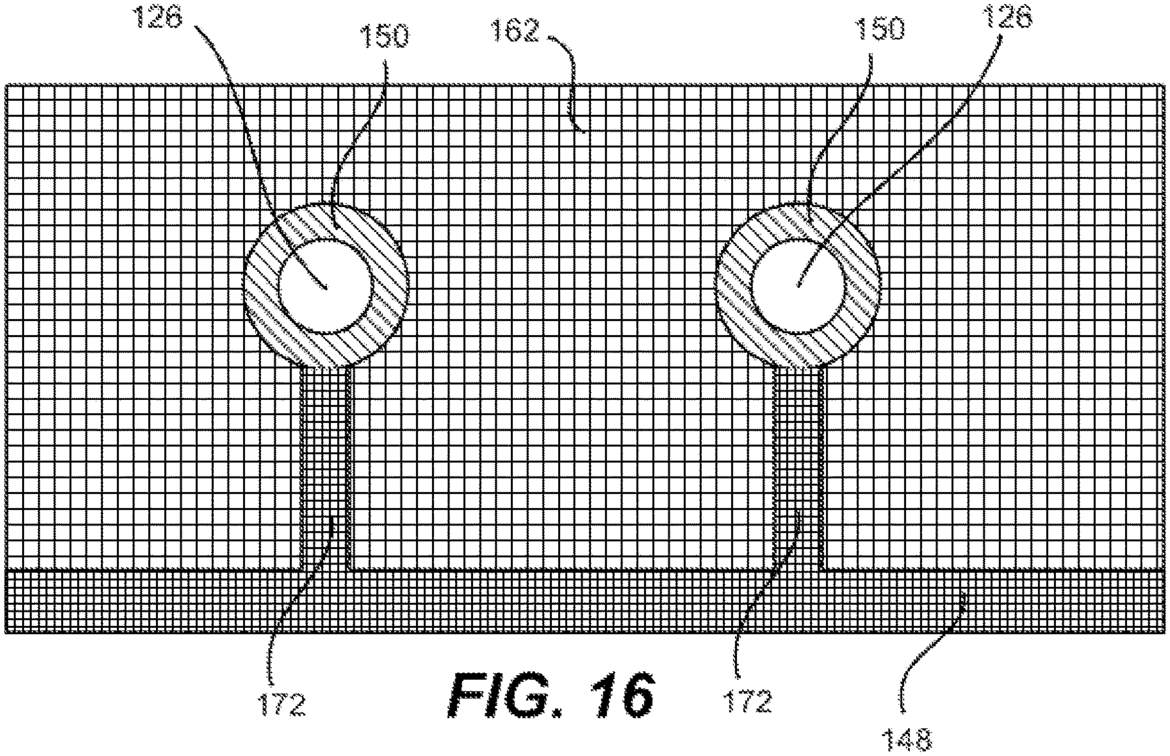

In a fourth embodiment, the negative photoresist material 154 may be imaged and developed to form channels down to the hydrophilic regions that are adjacent to the hydrophobic regions 150 around the nozzle holes 126 and that promote the flow of fluid away from the nozzle holes. In some embodiments, the channels have a wedge shape 170 in planar view as shown in FIG. 15. In other embodiments, the channels have a rectangular shape 172 in planar view as shown in FIG. 16. The rectangular shaped channel 172 may be made sufficiently narrow to promote capillary action to urge fluid away from the nozzle holes 126. Various other geometric shaped channels may also be used provided the channels are deep enough to go from the exposed surface of the hydrophobic levees 162 down to the hydrophilic region 148 below the hydrophobic levees 162.

Figure 17:
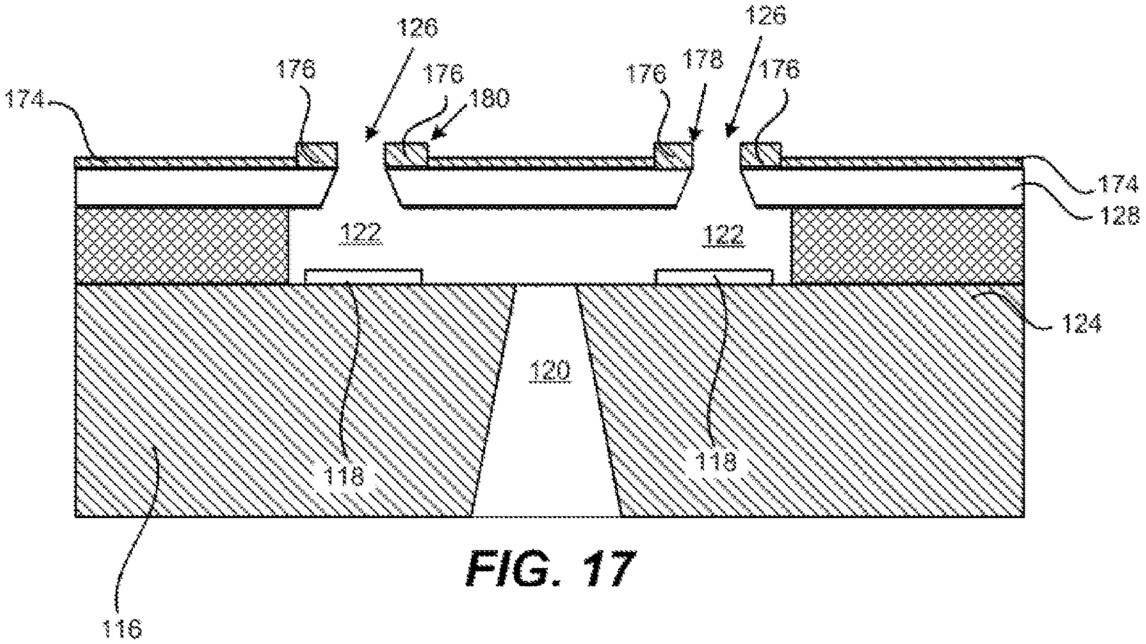
FIG. 17 is a cross-sectional view, not to scale of an ejection head according to a fifth embodiment of the disclosure.

In a fifth embodiment, a thick hydrophobic layer 174 applied to the nozzle plate layer 128 may be partially etched around the protective caps 142, described above, to provide hydrophobic ridges 176 around the nozzle holes 126 as shown in FIG. 17. The thick hydrophobic layer may be greater than 5 microns thick up to about 10 microns thick. Inner corners 178 of the hydrophobic ridges 176 act as a first drop-pinning boundary and outer corners 180 of the hydrophobic ridges act as a second drop-pinning boundary to prevent fluid droplets from covering the nozzle holes 126.

Figure 18:
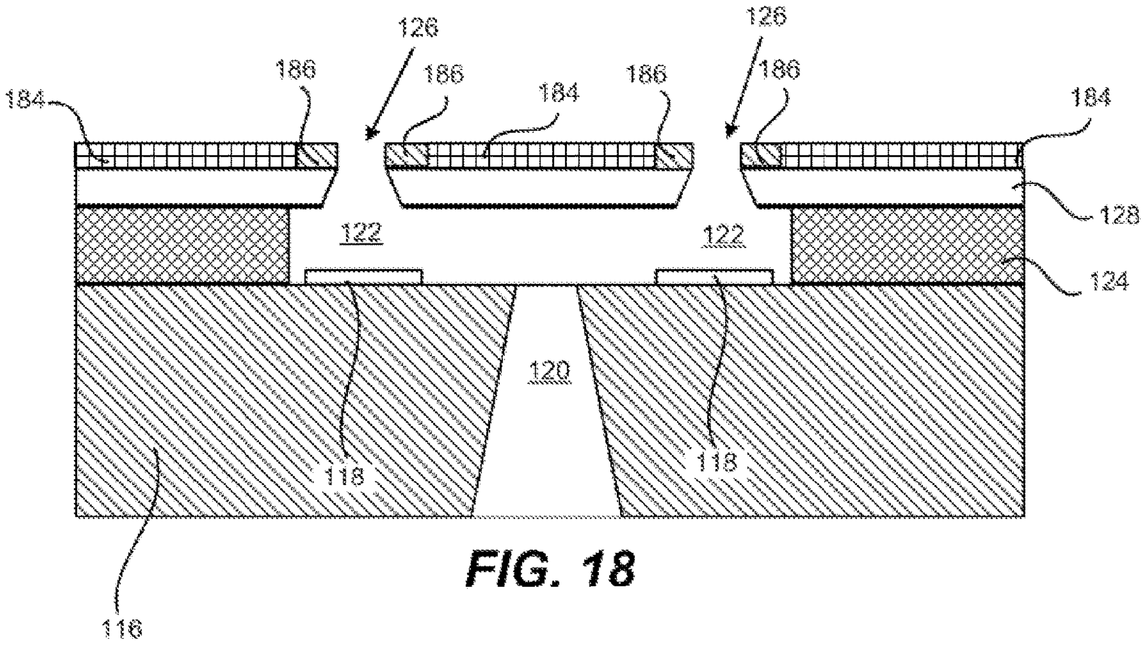
FIG. 18 is a cross-sectional view, not to scale, of an ejection head according to a sixth embodiment of the disclosure.

In a sixth embodiment, the thick hydrophobic layer 174, may be sputtered or etched so that the hydrophobic surface is roughened but not completely removed in the uncapped regions 184 surrounding the capped regions 186 as shown in FIG. 18. The foregoing embodiment provides a nozzle plate having smooth hydrophobic regions 186 surrounding the nozzle holes 126 and roughened hydrophobic regions 184 surrounding the smooth hydrophobic regions 186. Dependent upon capillary, gravitational, and viscous contributions, as well as the surface energy of the nozzle plate and the surface tension of the fluid, increasing the surface roughness of the nozzle plate is believed to decrease the wettability of some fluids, thereby acting as micro-levees around the nozzle hole.

In all of the above embodiments, the photoresist materials may be deposited via spin coating, spray coating or by laminating, with laminating being the most practical in some situations. In the case of spin coating, the photoresist material must be sufficiently viscous and the cast rates sufficiently high so that the photoresist layer tents over the top of the nozzle holes 126.

The photoresist materials described in the embodiments herein contain photoacid generators and may be formulated to include one or more of a multi-functional epoxy compound, a di-functional epoxy compound, a relatively high molecular weight polyhydroxy ether, an adhesion enhancer, and an aliphatic ketone solvent. For purposes of the disclosure, "difunctional epoxy" means epoxy compounds and materials having only two epoxy functional groups in the molecule. "Multifunctional epoxy" means epoxy compounds and materials having more than two epoxy functional groups in the molecule.

An epoxy component for making a photoresist formulation according to the disclosure, may be selected from aromatic epoxides such as glycidyl ethers of polyphenols. An exemplary first multi-functional epoxy resin is a polyglycidyl ether of a phenolformaldehyde novolac resin such as a novolac epoxy resin having an epoxide gram equivalent weight ranging from about 190 to about 250 and a viscosity at 130° C. ranging from about 10 to about 60 centipoise.

The multi-functional epoxy component may have a weight average molecular weight of about 3,000 to about 5,000 Daltons as determined by gel permeation chromatography, and an average epoxide group functionality of greater than 3, preferably from about 6 to about 10. The amount of multifunctional epoxy resin in a photoresist formulation may range from about 30 to about 50 percent by weight based on the weight of the dried photoresist layer.

The di-functional epoxy component may be selected from di-functional epoxy compounds which include diglycidyl ethers of bisphenol-A, 3,4-epoxycyclohexylmethyl-3,4-epoxycyclo-hexene carboxylate, 3,4-epoxy-6-methylcyclohexylmethyl-3,4-epoxy-6-methylcyclohexene carboxylate, bis(3,4-epoxy-6-methylcyclohexylmethyl) adipate, and bis(2,3-epoxycyclopentyl) ether.

An exemplary di-functional epoxy component is a bisphenol-A/epichlorohydrin epoxy resin having an epoxide equivalent of greater than about 1000. An "epoxide equivalent" is the number of grams of resin containing 1 gram-equivalent of epoxide. The weight average molecular weight of the di-functional epoxy component is typically above 2500 Daltons, e.g., from about 2800 to about 3500 weight average molecular weight. The amount of the first di-functional epoxy component in a photoresist formulation may range from about 30 to about 50 percent by weight based on the weight of the cured resin.

Exemplary photoacid generators include compounds or mixture of compounds capable of generating a cation such as an aromatic complex salt which may be selected from onium salts of a Group VA element, onium salts of a Group VIA element, and aromatic halonium salts. Aromatic complex salts, upon being exposed to ultraviolet radiation or electron beam irradiation, are capable of generating acid moieties which initiate reactions with epoxides. The photoacid generator may be present in the photoresist formulations described herein in an amount ranging from about 5 to about 15 weight percent based on the weight of the cured resin.

Compounds that generate a protic acid when irradiated by active rays, may be used as the photoacid generator, including, but are not limited to, aromatic iodonium complex salts and aromatic sulfonium complex salts. Examples include di-(t-butylphenyl)iodonium triflate, diphenyliodonium tetrakis(pentafluorophenyl)borate, diphenyliodonium hexafluorophosphate, diphenyliodonium hexafluoroantimonate, di(4-nonylphenyl)iodonium hexafluorophosphate, [4-(octyloxy)phenyl]phenyliodonium hexafluoroantimonate, triphenylsulfonium triflate, triphenylsulfonium hexafluorophosphate, triphenylsulfonium hexafluoroantimonate, triphenylsulfonium tetrakis(pentafluorophenyl)borate, 4,4'-bis[diphenylsulfonium]diphenylsulfide, bis-hexafluorophosphate, 4,4'-bis[di([beta]-hydroxyethoxy) phenylsulfonium]diphenylsulfide bis-hexafluoroantimonate, 4,4'-bis[di([beta]-hydroxyethoxy)(phenylsulfonium)diphenyl sulfide-bishexafluoro-phosphate 7-[di(p-tolyl)sulfonium]-2-isopropylthioxanthone hexafluorophosphate, 7-[di (p-tolyl)sulfonio-2-isopropylthioxanthone hexafluoroantimonate, 7-[di(p-tolyl)sulfonium]-2-isopropyl tetrakis(pentafluorophenyl)borate, phenylcarbonyl-4'-diphenylsulfonium diphenylsulfide hexafluorophosphate, diphenylsulfide phenylcarbonyl-4'-diphenylsulfonium 4-tert-butylphenylcarbonyl-4'-diphenylsulfonium hexafluoroantimonate, diphenylsulfide hexafluorophosphate, 4-tert-butylphenylcarbonyl-4'-diphenylsulfonium diphenylsulfide hexafluoroantimonate, diphenylsulfide 4-tert-butylphenylcarbonyl-4'-diphenylsulfonium tetrakis (pentafluorophenyl)borate, diphenyl [4-(phenylthio)phenyl] sulfonium hexafluoroantimonate and the like.

Hydrophobicity agents that may be used in the positive or negative photoresist material include silicon containing materials such as silanes and siloxanes. Accordingly, the hydrophobicity agents may be selected from heptadecafluoro-decyltrimethoxysilane, octadecyldimethylchlorosilane, octadecyltrichlorosilane, methyltrimethoxysilane, octyltriethoxysilane, phenyltrimethoxysilane, t-butylmethoxysilane, tetraethoxysilane, sodium methyl siliconate, vinyltrimethoxysilane, N-(3-(trimethoxylsilyl)propyl)ethylenediamine polymethylmethoxysiloxane, polydimethylsiloxane, polyethylhydrogensiloxane, and dimethyl siloxane. The amount of hydrophobicity agent in the cured photoresist material may about 0.5 to about 2 weight percent, such as from about 1.0 to about 1.5 weight percent based on total weight of the cured resin, including all ranges subsumed therein.

A solvent for use in preparing photoresist formulations is a solvent which is non-photoreactive. Non-photoreactive solvents include, but are not limited to gamma-butyrolactone, C1-6 acetates, tetrahydrofuran, low molecular weight ketones, mixtures thereof and the like. The non-photoreactive solvent is present in the formulation mixture used to provide the photoresist material in an amount ranging from about 20 to about 90 weight percent, such as from about 40 to about 60 weight percent, based on the total weight of the photoresist formulation. The non-photoreactive solvent typically does not remain in the cured photoresist layer and is thus removed prior to or during the photoresist layer curing steps.

The photoresist formulation may optionally include an effective amount of an adhesion enhancing agent such as a silane compound. Silane compounds that are compatible with the components of the photoresist formulation typically have a functional group capable of reacting with at least one member selected from the group consisting of the multifunctional epoxy compound, the difunctional epoxy compound and the photoinitiator. Such an adhesion enhancing agent may be a silane with an epoxide functional group such as 3-(guanidinyl)propyltrimethoxysilane, and a glycidoxyalkyltrialkoxysilane, e.g., gamma-glycidoxypropyltrimethoxysilane. When used, the adhesion enhancing agent can be present in an amount ranging from about 0.5 to about 2 weight percent, such as from about 1.0 to about 1.5 weight percent based on total weight of the cured resin, including all ranges subsumed therein. Adhesion enhancing agents, as used herein, are defined to mean organic materials soluble in the photoresist composition which assist the film forming and adhesion characteristics of the photoresist layer.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A nozzle plate configured for a fluid ejection head, the nozzle plate comprises a plurality of nozzle holes therein attached to a flow feature layer on a semiconductor substrate, wherein the nozzle plate further comprises (i) a first hydrophobic region surrounding each of the plurality of nozzle holes, the first hydrophobic region having a thickness of from 3 μm to 10 μm, (ii) a hydrophilic region adjacent to the first hydrophobic region, and (iii) a raised second hydrophobic region over the hydrophilic region, the raised second hydrophobic region having a thickness of from 1 μm to 2.5 μm, wherein the raised second hydrophobic region comprises a channel therein in fluid flow communication with the first hydrophobic region surrounding each of the plurality of nozzle holes, and the channel is configured to channel fluid away from each of the plurality of nozzle holes through the raised second hydrophobic region.

2. The nozzle plate of claim 1, wherein the channel is wedge-shaped.

3. A fluid ejection head comprising the nozzle plate of claim 1.

4. The nozzle plate of claim 1, wherein the hydrophilic region has the same thickness as the first hydrophobic region.

5. A fluid ejection head comprising:

a semiconductor substrate containing a plurality of fluid ejectors thereon, a flow feature layer attached to the semiconductor substrate, and a nozzle plate containing a plurality of nozzle holes therein attached to the flow feature layer on a semiconductor substrate, wherein the nozzle plate contains (i) a first hydrophobic region surrounding each of the plurality of nozzle holes, the first hydrophobic region having a thickness of from 3 μm to 10 μm, (ii) a hydrophilic region adjacent to the first hydrophobic region, and (iii) a raised second hydrophobic region over the hydrophilic region, the raised second hydrophobic region having a thickness of from 1 μm to 2.5 μm, wherein the raised second hydrophobic region comprises a channel therein in fluid flow communication with the first hydrophobic region surrounding each of the plurality of nozzle holes, and the channel is configured to channel fluid away from each of the plurality of nozzle holes through the raised second hydrophobic region.

6. The fluid ejection head of claim 5, wherein the channel is wedge-shaped.

7. A fluid ejection device comprising the fluid ejection head of claim 5.

8. The fluid ejection head of claim 5, wherein the hydrophilic region has the same thickness as the first hydrophobic region.

* * * * *